(12) United States Patent
Kim et al.

(10) Patent No.: US 7,911,552 B2
(45) Date of Patent: Mar. 22, 2011

(54) DISPLAY SUBSTRATE, LIQUID CRYSTAL DISPLAY DEVICE INCLUDING THE SAME, AND METHOD OF REPAIRING THE SAME

(75) Inventors: Duk Sung Kim, Jeolianam-do (KR); Sung Haeng Cho, Choongcheongbuk-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 738 days.

(21) Appl. No.: 11/930,690

(22) Filed: Oct. 31, 2007

(65) Prior Publication Data
US 2009/0284679 A1    Nov. 19, 2009

(30) Foreign Application Priority Data
Dec. 27, 2006    (KR) .................. 10-2006-0134680

(51) Int. Cl.
*G02F 1/1333*    (2006.01)

(52) U.S. Cl. ........................................ 349/54; 349/192

(58) Field of Classification Search .................... 349/54, 349/192
See application file for complete search history.

(56) References Cited

U.S. PATENT DOCUMENTS
6,111,621 A * 8/2000 Kim et al. ..................... 349/54

FOREIGN PATENT DOCUMENTS
| JP | 1998-170946 | 6/1998 |
| JP | 2003-344874 | 12/2003 |
| KR | 2002-0061851 | 7/2002 |

* cited by examiner

*Primary Examiner* — Richard H Kim
(74) *Attorney, Agent, or Firm* — F. Chau & Associates LLC.

(57) ABSTRACT

A display substrate includes a signal line formed on a substrate, a connection pad receiving a driving signal from the signal line, at least one repair line formed along an outer periphery of the substrate, a first auxiliary repair line overlapping the signal fine at a first position with an insulating layer disposed therebetween, a second auxiliary repair line overlapping the signal line at a second position with the insulating layer disposed therebetween, and a connection line connecting the second auxiliary repair fine to the at least one repair line.

22 Claims, 7 Drawing Sheets

DISPLAY SUBSTRATE, LIQUID CRYSTAL DISPLAY DEVICE INCLUDING THE SAME, AND METHOD OF REPAIRING THE SAME

CROSS-REFERENCE TO RELATED APPLICATION

This application claims priority to Korean Patent Application No. 10-2006-0134680, filed on Dec. 27, 2006, the disclosure of which is incorporated herein by reference in its entirety.

BACKGROUND OF THE INVENTION

1. Technical Field

The present disclosure relates to a liquid crystal display (LCD) device and, more particularly, to a liquid crystal display (LCD) device including a display substrate, and a method of repairing the display substrate.

2. Discussion of the Related Art

A liquid crystal display (LCD) displays an image by controlling the light transmittance of liquid crystal having dielectric anisotropy using an electric field. The LCD device includes a liquid crystal panel displaying an image, a panel driver driving the liquid crystal panel, and a backlight unit supplying light to the liquid crystal panel.

The liquid crystal panel includes a color filter substrate where a color filter array is formed and a thin film transistor (TFT) substrate where a TFT array is formed. The color filter substrate and the TFT substrate are combined with each other having the liquid crystal disposed therebetween. The color filter substrate includes a common electrode receiving a common voltage. The TFT substrate includes a plurality of pixel electrodes arranged in a matrix and receiving a data voltage. The TFT substrate includes a plurality of thin film transistors TFTs for individually driving the plurality of pixel electrodes, a gate line for sequentially turning on the TFTs, and a data fine supplying a data voltage to the TFTs.

Since signal lines including the gate line and the data line formed on the TFT substrate have a narrow width, for example, less than a few micrometers, disconnections may occur. The TFT substrate includes a repair line for repairing a disconnected signal line. The repair line can be formed in the shape of a ring overlapping the signal lines along the outer periphery of the TFT substrate. The repair line supplies a signal to the disconnected signal line using a laser welding to an overlapping portion between the repair line and the signal line. However, at least five repair points are used in a repair process of the repair line and the disconnected signal line. When the number of the repair points is increased, a repair success rate is reduced, and the signal supplied to the disconnected signal line is affected by the RC delay due to a contact resistance generated in the repair points. An image quality can be deteriorated near the repaired signal line due to the RC delay.

SUMMARY OF THE INVENTION

Embodiments of the present invention provides a display substrate, a liquid crystal display (LCD) device including the same, and a method of repairing the same, in which the number of repair points is reduced to improve repair reliability after a repair process and RC delay of a repaired signal fine is reduced.

According to an exemplary embodiment of the present invention, a display substrate includes a signal line formed on a substrate, a connection pad receiving a driving signal from the signal line, at least one repair line formed along an outer periphery of the substrate, a first auxiliary repair line overlapping the signal line at a first position with an insulating layer disposed therebetween, a second auxiliary repair line overlapping the signal line at a second position with the insulating layer disposed therebetween, and a connection line connecting the second auxiliary repair line to the at least one repair line.

The first auxiliary repair line and the second auxiliary repair line can be connected to the signal line during a repairing process.

The signal line can comprise a gate line supplying gate-on and gate-off voltages, and a data line intersecting the gate line with the insulating layer disposed therebetween.

The display substrate may further comprise a TFT provided in a pixel area and connected to the gate line and the data line, and a pixel electrode connected to the TFT.

The repair line can be formed of the same metal as the gate line on the same plane.

The first and second auxiliary repair lines can be formed of the same metal as the repair line on the same plane.

The connection line can be formed of the same metal as at least one of the data line and the pixel electrode on the same plane.

The connection pad may comprise a gate connection pad connected to the gate line and a data connection pad connected to the data line.

A plurality of data connection pads may constitute a data connection pad block.

The first auxiliary repair line may intersect the data lines connected to each of the data connection pad blocks, and one end of the first auxiliary repair line can be connected to a repair connection pad included in any one of the data connection pad blocks and the other end of the first auxiliary repair line can be in a floating state.

The second auxiliary repair line may intersect the data lines connected to each of the data connection pad blocks in a floating state.

The respective first and second auxiliary repair lines can be provided in the same number as the repair lines.

The TFT substrate may further comprise a dummy line extended from the first auxiliary repair line.

The dummy line may intersect the repair line.

According to an exemplary embodiment of the present invention, a liquid crystal display (LCD) device comprises a liquid crystal panel, a panel driver connected to a connection pad of the liquid crystal panel and supplying a driving signal to a signal line of the liquid crystal panel, and a circuit board where a second repair line connected to a first repair line is formed, wherein the liquid crystal panel includes a first substrate comprising the signal line formed on a substrate, the connection pad receiving a driving signal from the signal line, a first repair line formed along an outer periphery of the substrate, a first auxiliary repair line overlapping the signal line at a first position with an insulating layer disposed therebetween, a second auxiliary repair line overlapping the signal fine at a second position with the insulating layer disposed therebetween, and a connection line connecting the second auxiliary repair line to the first repair line, and a second substrate facing the first substrate with a liquid crystal interposed therebetween.

The first auxiliary repair line and the second auxiliary repair line can be connected to the signal line during a repairing process.

The panel driver may comprise a gate driving circuit supplying gate-on and gate-off voltages to a gate line, a data driving circuit supplying a data voltage to a data line, and a tape carrier package mounting the data driving circuit, wherein one side of the tape carrier package is connected to the connection pad and the other side of the tape carrier package is connected to the circuit board.

The connection pad may comprise a gate connection pad connected to the gate line, and a data connection pad connected to the data line, and wherein a plurality of data connection pads constitute a data connection pad block connected to any one of the tape carrier packages.

The first and second auxiliary repair lines can intersect the data lines connected to each of the data connection pad blocks.

The first auxiliary repair line can be connected to a repair connection pad formed adjacent at least one of the data connection pads formed in the data connection pad block.

The circuit board may include a third auxiliary repair line connecting the second repair line and the first auxiliary repair line in a repairing process.

A number of the first repair lines can be the same as a number of the second repair lines and the first to third auxiliary repair lines.

According to an exemplary embodiment of the present invention, a method of repairing a liquid crystal display device comprises supplying a driving signal to signal lines of a first substrate to detect a disconnected signal line, welding a first auxiliary repair line overlapping a first portion of the disconnected signal line, welding a second auxiliary repair line overlapping a second portion of the disconnected signal line, bisecting a first repair line formed on the first substrate, connecting a circuit board where a second repair line is formed to a liquid crystal panel to connect the first repair line to the second repair line, connecting the second repair line to the first auxiliary repair line connected to the disconnected signal line, and cutting the second repair line corresponding to the disconnected first repair line.

The method may further comprise cutting one side of the first substrate along a substrate cutting line of the first substrate to separate the first repair line and a dummy line formed between the substrate cutting line and the edge of the first substrate from the first substrate, and combining a second substrate facing the first substrate to form the liquid crystal panel.

Connecting the second repair line to the first auxiliary repair line connected to the disconnected signal line may comprise connecting a third auxiliary repair line, coupled to the disconnected data line, to the second repair line.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set for the herein.

Figure 1:
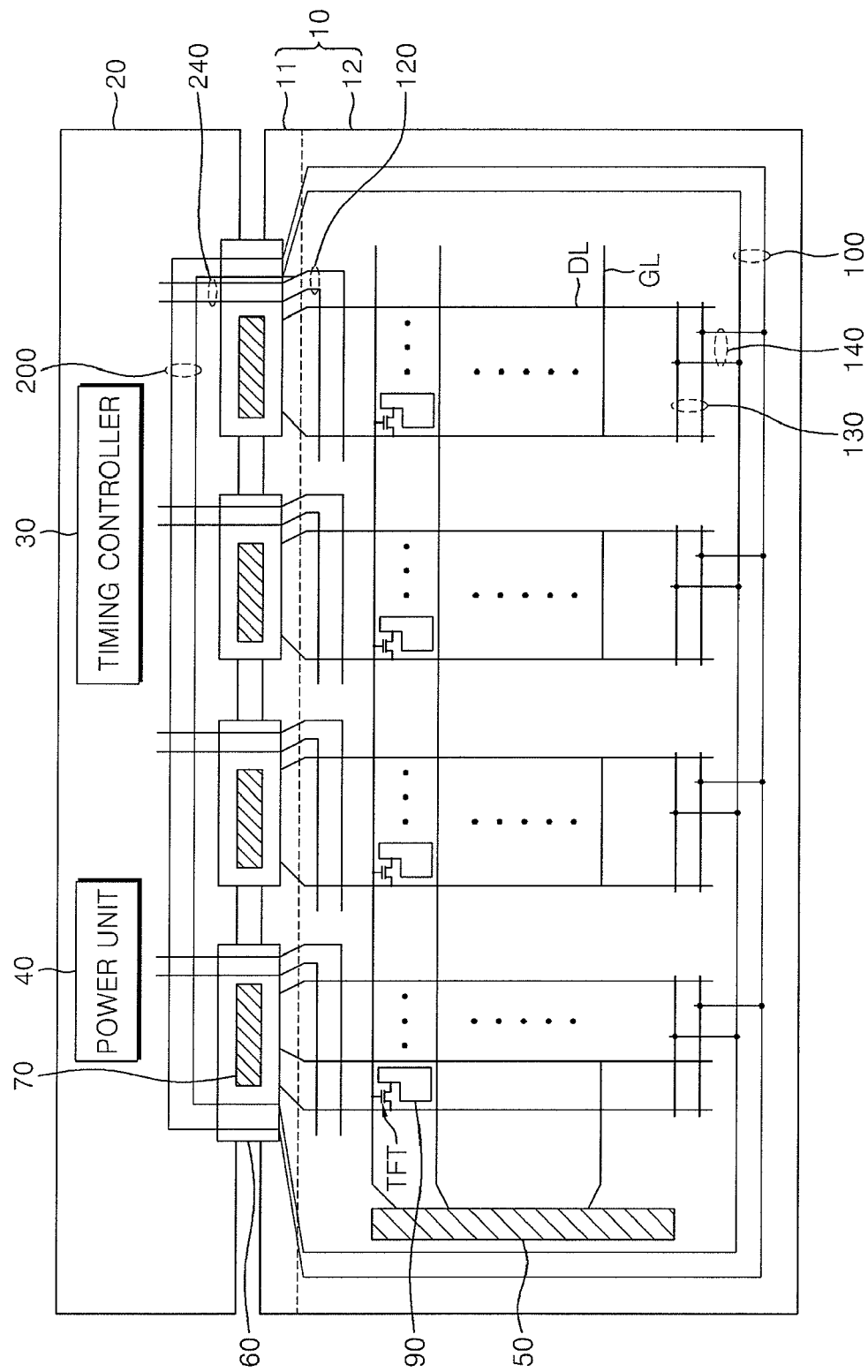
FIG. 1 is a plan view of an LCD device in accordance with an exemplary embodiment of the present invention.

FIG. 1 is a plan view of an LCD device in accordance with an exemplary embodiment of the present invention.

Referring to FIG. 1, the LCD device includes a liquid crystal panel 10, a gate driving circuit 50, a data driving circuit 70, a data printed circuit board (PCB) 20, and a data tape carrier package (TCP) 60. The liquid crystal panel 10 displays an image and a first repair line 100 is formed thereon. The gate driving circuit 50 and the data driving circuit 70 supply driving signals to signal lines GL and DL of the liquid crystal panel 10. The data printed circuit board (PCB) 20 includes a second repair line 200, a timing controller 30 and a power unit 40. The data tape carrier package (TCP) 60 is connected to the data PCB 20 and connected to the liquid crystal panel 10. The data TCP 60 mounts the data driving circuit 70.

The data PCB 20 includes the power unit 40 and the timing controller 30. The power unit 40 supplies power signals to the gate driving circuit 50 and the data driving circuit 70. The timing controller 30 supplies control signals. The data PCB 20 includes the second repair line 200 connected to the first repair line 100 and a third auxiliary repair line 240. The third auxiliary repair line 240 connects a first auxiliary repair line 120 of the liquid crystal panel 10 to the second repair line 200 during a repair process.

The power unit 40 supplies a gate-on voltage and a gate-off voltage to the gate driving circuit 50 and an analog driving voltage to the data driving circuit 70.

The timing controller 30 generates a gate start pulse, a gate shift clock and a gate output control signal. The timing controller 30 supplies the gate start pulse, the gate shift clock and the gate output control signal to the gate driving circuit 50. The timing controller 30 supplies data control signals including a data start pulse, a data shift clock and a polarity control signal to the data driving circuit 70. The timing controller 30 supplies a digital data signal received from outside to the data driving circuit 70.

The second repair lines 200 can be provided in the same number as the first repair lines 100 arranged on a thin film transistor (TFT) substrate 11. The second repair lines 200 are connected to the first repair lines 100 to form a closed loop. One side of the third auxiliary repair line 240 is connected to the data TCP 60 and the other side thereof is connected to the second repair line 200. Such that the data voltage applied to the first auxiliary repair line 120 is supplied to the second repair line 200. In an exemplary embodiment of the present invention, a second auxiliary repair line 130 can be selectively connected to the second repair line 200 during a repair process.

The data PCB 20 is electrically connected to one side of the data TOP 60 mounting the data driving circuit 70.

The data TCP 60 includes a pattern supplying a signal. In an exemplary embodiment, the data TCPs 60 connected to the left and right ends of the data PCB 20 include a signal pattern connecting the first repair line 100 to the second repair line 200. Each of the data TCPs 60 includes a signal pattern connecting the first auxiliary repair line 120 to the third auxiliary repair line 240. The other side of the data TCP 60 is connected to a data connection pad block 180 (FIG. 2) formed on one side of the liquid crystal panel 10. The other side of the data TCP 60 is electrically connected to the signal pattern, a data connection pad 82 and a repair connection pad 122 (FIG. 3).

The liquid crystal panel 10 includes a TFT array, a first substrate 11 where the first repair line 100 is formed to repair the signal lines GL and DL of the TFT array, and a second substrate 12 facing the first substrate 11 with the liquid crystal disposed therebetween. The first substrate 11 can be referred to as a TFT substrate 11 and the second substrate 12 can be referred to as a color filter substrate 12.

The color filter substrate 12 includes a black matrix preventing light leakage, a color filter displaying color arranged in a pixel area, and a common electrode facing a pixel electrode 90 formed on the TFT substrate 11 to generate a vertical electric field.

The liquid crystal having dielectric anisotropy can be driven by the vertical electric field generated between the pixel electrode 90 formed on the TFT substrate 11 and the common electrode formed on the color filter substrate 12 to control the light transmittance.

Figure 2:
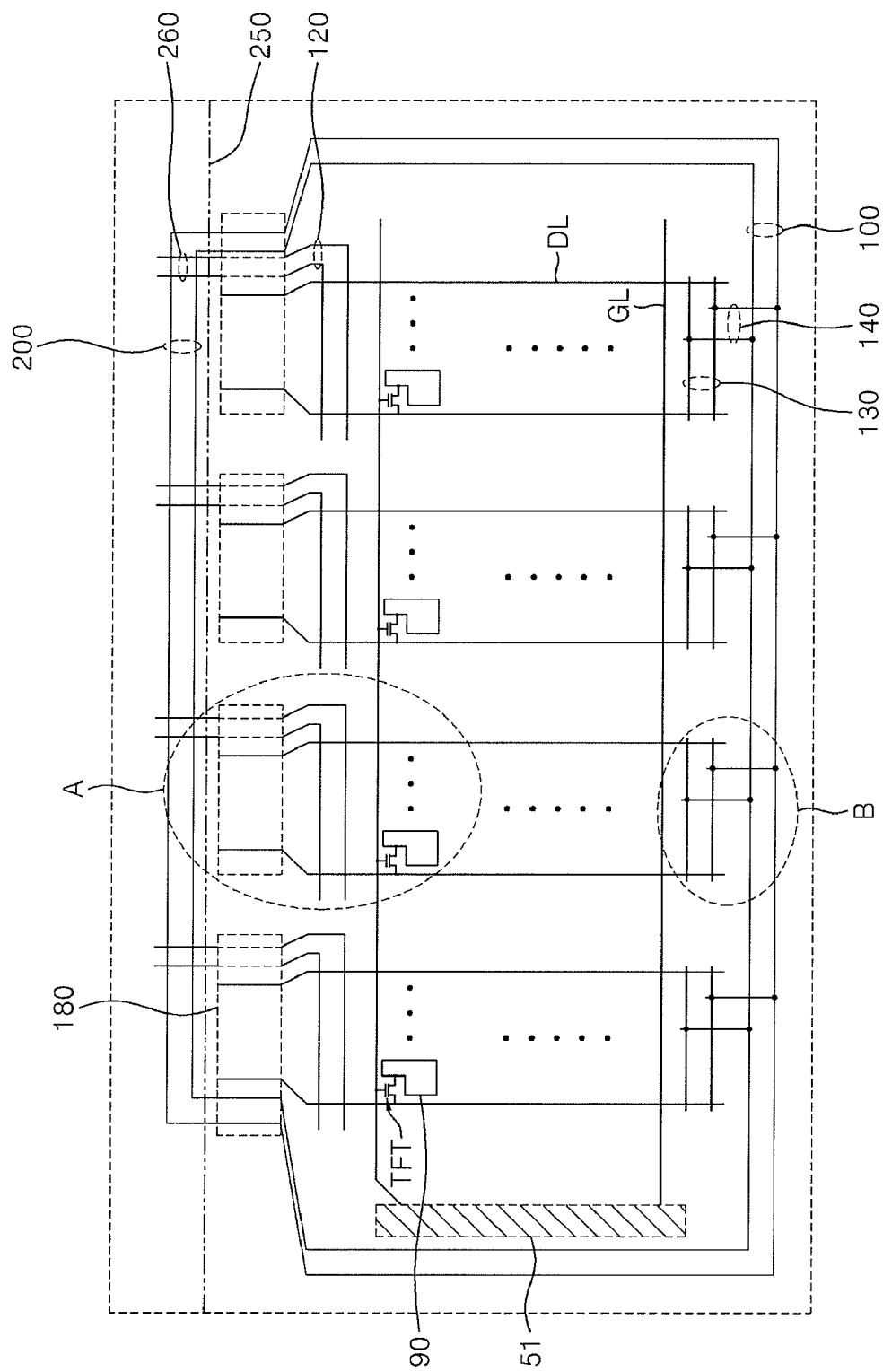
FIG. 2 is a plan view of a TFT substrate of an LCD device according to an exemplary embodiment of the present invention.
Figure 3:
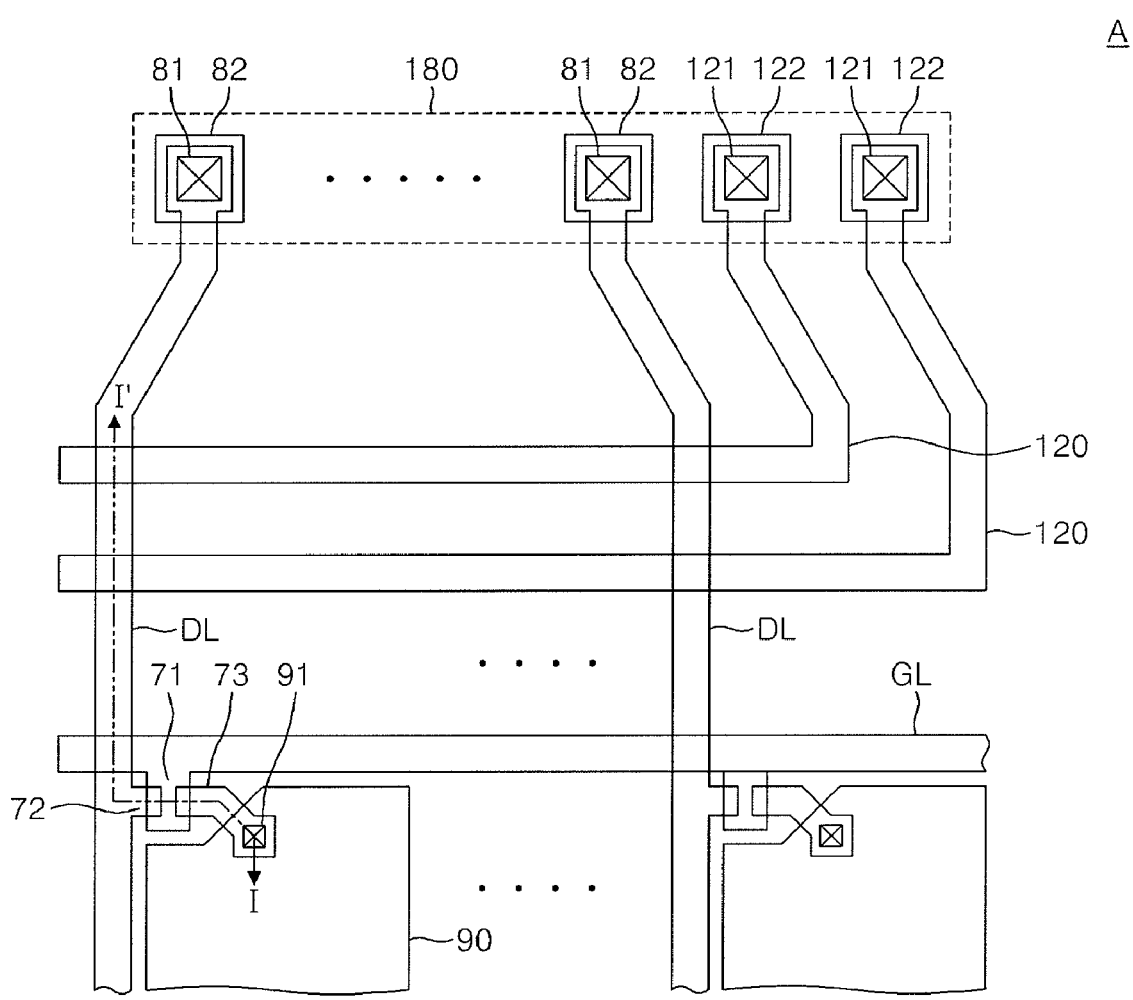
FIG. 3 is an enlarged view of area A in FIG. 2.
Figure 4:
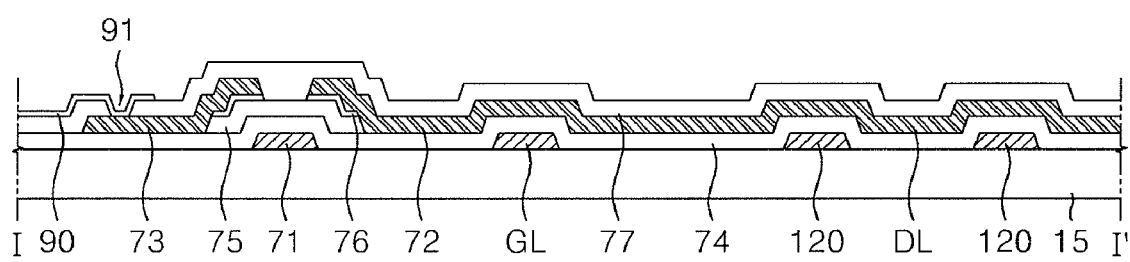
FIG. 4 is a cross-sectional view taken along the line I-I' in FIG. 3 according to an exemplary embodiment of the present invention.

FIG. 2 is a plan view of a TFT substrate in accordance with an exemplary embodiment of the present invention. FIG. 3 is an enlarged view of area A in FIG. 2 according to an exemplary embodiment of the present invention. FIG. 4 is a cross-sectional view taken along the line I-I' of area A in FIG. 3 according to an exemplary embodiment of the present invention.

Referring to FIGS. 2, 3 and 4, the TFT substrate 11 includes the signal lines GL and DL arranged in a display area on a substrate 15, a TFT connected to the signal lines GL and DL, the pixel electrode 90 connected to the TFT the first repair line 100 provided in a non-display area of the outer periphery of the substrate 15, the first auxiliary repair line 120 overlapping one side of the signal lines GL and DL and connected thereto during a repairing process, the second auxiliary repair line 130 overlapping the other side of the signal lines GL and DL and connected thereto during a repairing process, and a connection line 140 connecting the second auxiliary repair line 130 to the first repair line 100.

The signal lines GL and DL are arranged in the display area. The pixel electrode 90 is formed in the display area. The signal lines GL and DL include a gate line GL supplying gate-on and gate-off voltages and a data line DL intersecting the gate line GL to supply a data voltage.

Connection pads 51 and 82 include a gate connection pad 51 formed on one end of the gate line GL and a data connection pad 82 formed on one end of the data line DL. The gate connection pad 51 may be directly connected to the gate driving circuit 50 or connected to a TCP mounting the gate driving circuit 50. The data connection pad 82 may be directly connected to the data driving circuit 70 or connected to the data TCP 60 mounting the data driving circuit 70. The data connection pad 82 is connected to one end of the data line DL through a first contact hole 81. In an exemplary embodiment, the data connection pads 82 may be included in one data connection pad block 180 connected to one driving circuit. Each of the data driving circuits 70 supplies a data voltage to about 300 to about 600 data lines DL. A plurality of data driving circuits 70 are used for a high resolution. Accordingly, the data connection pads 82 are included in the data connection pad block 180 connected to about 300 to about 600 data lines DL in a bundle. Each of the data driving circuits 70 or the data TCPs 60 is connected to the data connection pad block 180.

The repair connection pad 122 is formed on one end of the first auxiliary repair line 120 and connected to the first auxiliary repair line 120 through a second contact hole 121 exposing the first auxiliary repair line 120. In an exemplary embodiment the gate connection pad 51, the data connection pad 82 and the repair connection pad 122 are formed of the same metal layer as the pixel electrode 90 on the same plane.

The gate line GL and the data line DL cross each other. The TFT is connected to the gate line GL and the data line DL. The pixel electrode 90 is connected to the TFT. The TFT is turned on by the gate-on voltage supplied from the gate line GL to supply the data voltage applied from the data line DL to the pixel electrode 90. In an exemplary embodiment, the first substrate 11 may include a storage electrode for maintaining the data voltage supplied to the pixel electrode 90 during one frame period.

Referring to FIGS. 3 and 4, the TFT includes a gate electrode 71 connected to the gate line GL, a source electrode 72 connected to the data line DL, a drain electrode 73 facing the source electrode 72 and connected to the pixel electrode 90, and a semiconductor layer 75 overlapping the gate electrode 71 with a gate insulating layer 74 disposed therebetween to form a channel between the source electrode 72 and the drain electrode 73. The TFT includes an ohmic contact layer 76 for forming an ohmic contact between the source and drain electrodes 72 and 73 and the semiconductor layer 75. The TFT supplies the data voltage applied to the data line DL to the pixel electrode 90 in response to the gate-on voltage applied to the gate line GL.

Referring to FIG. 4, the pixel electrode 90 is formed on a passivation layer 77 covering the TFT and connected to the drain electrode 73 via a pixel contact hole 91 penetrating the passivation layer 77. When the data voltage is supplied from the TFT, the pixel electrode 90 drives the liquid crystal by a voltage difference with respect to a common electrode (not shown) formed on the color filter substrate 12, thus controlling the light transmittance. The pixel electrode 90 can be formed of a transparent conductive metal material such as indium tin oxide (ITO) or indium zinc oxide (IZO).

The first repair line 100 is formed in a ring shape along the non-display area of the outer periphery of the TFT substrate 11. A plurality of first repair lines 100 may be formed parallel to each other. In an exemplary embodiment, two first repair lines 100 can be formed as shown in FIG. 2. The first repair lines 100 can be formed of the same metal as the gate line GL on the same plane.

The first auxiliary repair line 120 overlaps the data line DL connected to the data connection pad block 180. The first auxiliary repair line 120 overlaps the data lines DL connected to the data connection pads 82 included in one data connection pad block 180. One side of the first auxiliary repair line 120 is in a floating state and the other side thereof is connected to the repair connection pad 122 through the second contact hole 121.

In an exemplary embodiment, the first auxiliary repair lines 120 are provided in the same number as the first repair lines 100. When the data line DL is disconnected, an overlapping portion between the first auxiliary repair line 120 and the data line DL can be laser-welded to electrically connect the disconnected data line to the first auxiliary repair line 120. The first auxiliary repair line 120 is formed of the same metal as the gate line GL on the same plane. Since the first auxiliary repair line 120 intersects the data fine DL with the gate insulating layer 74 disposed therebetween, the intersection between the first auxiliary repair fine 120 and the data fine DL is laser-welded in a repairing process. As such, the repair points are reduced to one.

Figure 5:
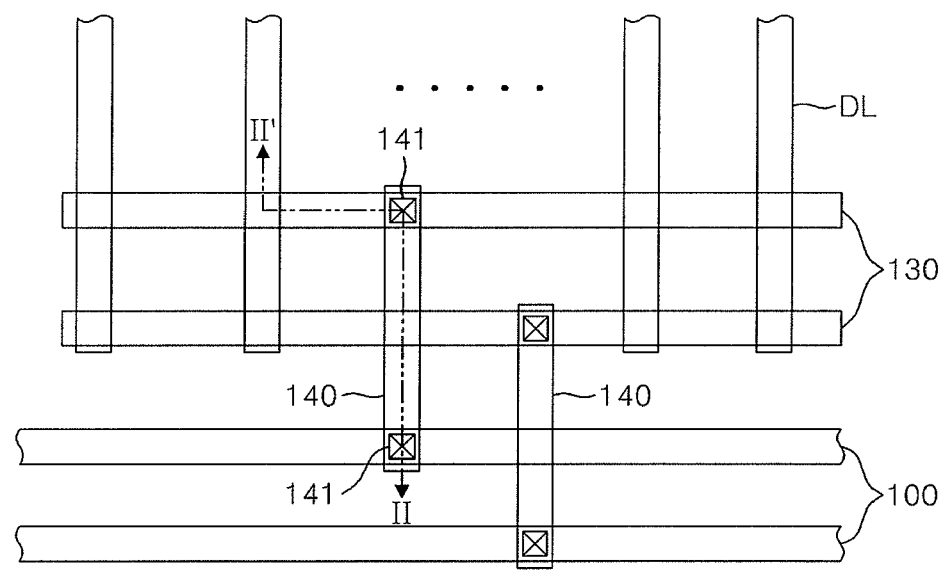
FIG. 5 is an enlarged view of area B in FIG. 2 according to an exemplary embodiment of the present invention.
Figure 6:
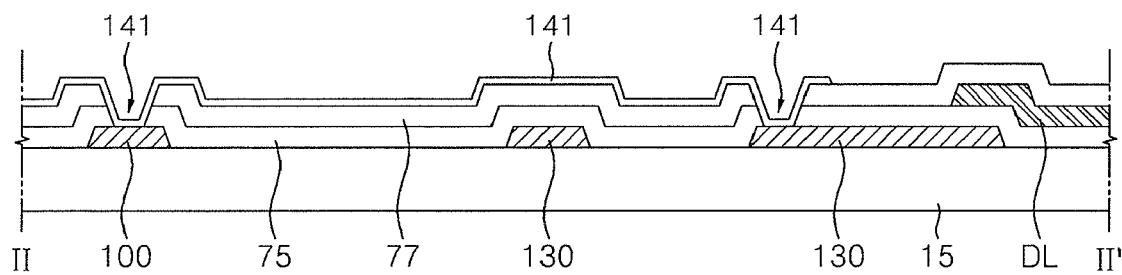
FIG. 6 is a cross-sectional view taken along the line II-II' in FIG. 5 according to an exemplary embodiment of the present invention.

FIG. 5 is an enlarged view of area B in FIG. 2 according to an exemplary embodiment of the present invention. FIG. 6 is a cross-sectional view taken along the line II-II' in FIG. 5 according to an exemplary embodiment of the present invention.

Referring to FIGS. 5 and 6, the second auxiliary repair lines 130 and the first repair lines 100 are arranged. The second auxiliary repair line 130 intersects the data line DL in a floating state. The second auxiliary repair line 130 can be formed of the same metal as the gate line GL to be insulated from the data line GL. The second auxiliary repair line 130 intersects the data line DL with the gate insulating layer 74 disposed therebetween. The second auxiliary repair lines 130 are included in one data connection pad block 180. In an exemplary embodiment, the second auxiliary repair lines 130 can be provided in the same number as the first repair lines 100. When the data line DL is disconnected, the overlapping portion between the second auxiliary repair line 130 and the data line DL can be laser-welded so that the second auxiliary repair line 130 is connected to the data line DL.

The second auxiliary repair line 130 is electrically connected to the first repair line 100 through the connection line 140. The connection line 140 is electrically connected to the first repair line 100 through a third contact hole 143 formed on the first repair line 100 and electrically connected to the second auxiliary repair line 130 through a fourth contact hole 141 formed on the second auxiliary repair line 130. The third and fourth contact holes 143 and 141 penetrate the gate insulating layer 74 and the passivation layer 77. The connection line 140 can be formed of the same transparent metal layer as the pixel electrode 90. For example, if the numbers of the first repair lines 100 and the second auxiliary repair lines 130 are more than two, each of the first repair lines 100 can respectively be connected to each of the second auxiliary repair lines 130. In an exemplary embodiment, the connection line 140 can intersect the first repair line 100 and the second auxiliary repair line 130. The connection line 140 can be connected to the first repair line 100 and the second auxiliary repair line 130 through the contact holes such as the third and fourth contact holes 143 and 141.

Figure 7:
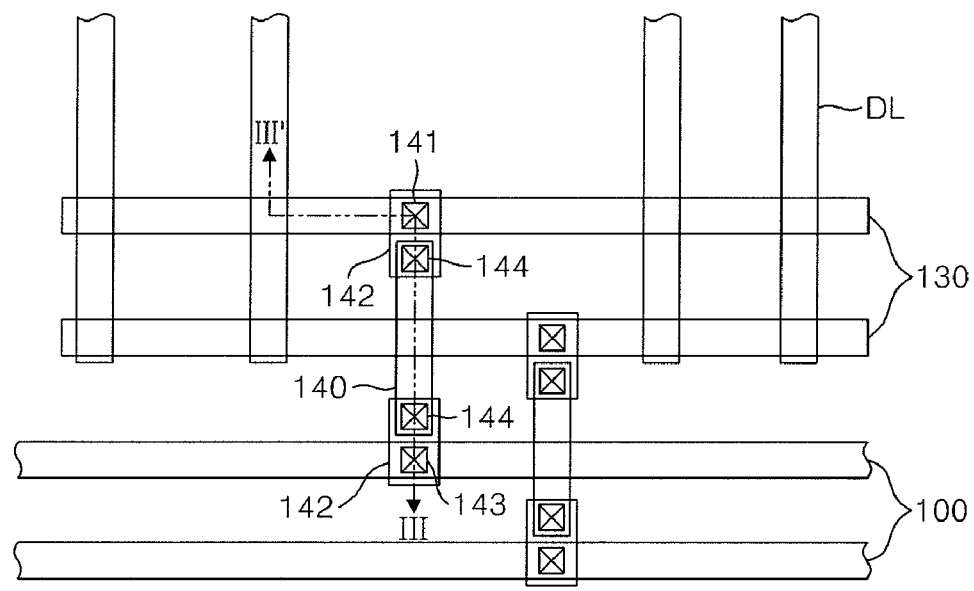
FIG. 7 is an enlarged view of area B in FIG. 2 according to an exemplary embodiment of the present invention.
Figure 8:
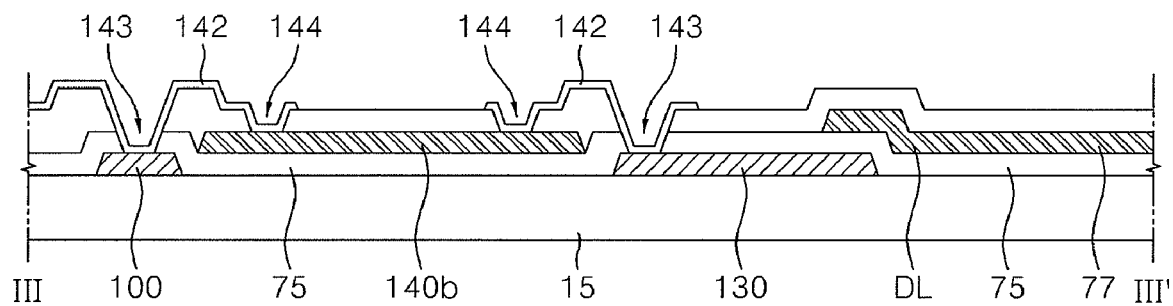
FIG. 8 is a cross-sectional view taken along the line III-III' in FIG. 7 according to an exemplary embodiment of the present invention.

Referring to FIGS. 7 and 8, the connection line 140 may be formed of the same metal as the data line DL. In an exemplary embodiment of the present invention, the connection line 140 is arranged between the second auxiliary repair line 130 and the first repair line 100 and electrically connected thereto through bridge electrodes 142. A fifth contact hole 144 exposing one end of the connection line 140 is connected to the third contact hole 143 formed on the first repair line 100 through a bridge electrode 142 such that the connection line 140 is electrically connected to the first repair line 100. Another fifth contact hole 144 exposing the other end of the connection line 140 is connected to the fourth contact hole 141 formed on the second auxiliary repair line 130 through another bridge electrode 142 such that the connection line 140 is electrically connected to the second auxiliary repair line 130. The fifth contact holes 144 exposing the connection line 140 penetrate the passivation layer 77. The bridge electrodes 142 can be formed of the same transparent conductive layer as the pixel electrode 90.

A dummy line 260 shown in FIG. 2 is extended from a side where the data connection pad 82 is connected to the data line DL to the first repair line 100. The dummy line 260 intersects the first repair line 100 with at least one of the gate insulating layer 74 and the passivation layer 77 interposed therebetween. In a repairing process, the dummy line 260 is connected to the first repair line 100 by, for example, a laser welding. The dummy line 260 is subsequently removed when manufacturing the liquid crystal panel 10.

Figure 9:
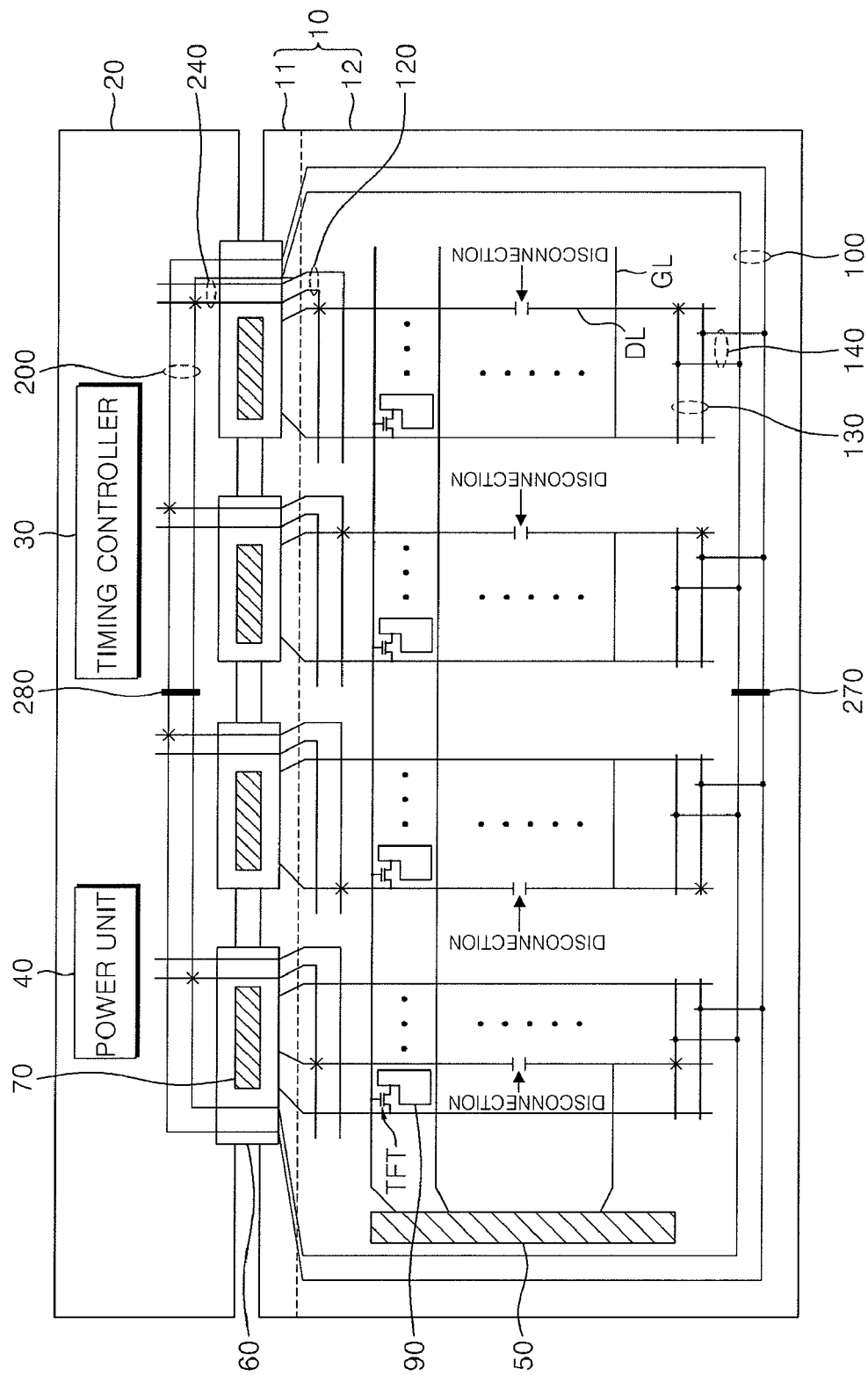
FIG. 9 is a plan view of an LCD device after a repairing process in accordance with an exemplary embodiment of the present invention.

The TFT substrate 11 detects a disconnection of the data line DL through a detection process. The TFT substrate 11 applies a test signal to the data connection pad 82 and measures the test signal to determine the disconnection based on a detected signal. The intersection between the first auxiliary repair line 120 and the disconnected data line DL is laser-welded. The intersection between the second auxiliary repair line 130 and the disconnected data line DL is laser-welded. Subsequently, the dummy line 260 positioned on the top of the data connection pad 82 and intersecting the first repair line 100 is electrically connected to the first repair line 100 to supply a data voltage to both sides of the disconnected data line DL. Referring to FIG. 9, the first repair line 100 is disconnected along a laser cutting line 270 to supply a repair signal, i.e. the data voltage to both sides thereof. For example, if each one of the data lines DL, connected to the data connection pad block 180 coupled to each of the data TCPs 60, is disconnected, the laser cutting line 270 cuts the first repair line 100 in the middle of the substrate 15. When the disconnected data lines DL are concentrated on the left or right side, the first repair line 100 can be act to bisect the number of the repaired data lines DL. When two data lines DL connected to a first data connection pad block 180 and at least one data line DL connected to a second data connection pad block 180 adjacent the first data connection pad block 180 are disconnected, the first repair line 100 can be cut based on the data connection pad block 180 connected to the two disconnected data lines DL.

After the disconnection test of the data lines DL, the TFT substrate 11 is cut along a substrate cutting line 250 shown in FIG. 2. The first repair lines 100 and the dummy lines 260 formed between the substrate cutting line 250 and the outer periphery of the substrate 15 are removed.

The TFT substrate 11 is combined with the color filter substrate 12 where the color filter array is formed. The liquid crystal can be disposed between the two substrates 11 and 12 prior to combining the two substrates. Alternatively, the liquid crystal can be injected into between the two substrates after the two substrates 11 and 12 are combined.

The data TCP 60 mounting the data driving circuit 70 is connected to one side of the liquid crystal panel 10. The other side of the data TCP 60 is connected to the data PCB 20. One side of the second repair line 200 formed on the data PCB 20 is connected to the signal pattern of the data TCP 60 arranged on one end of the data PCB 20. One side of the second repair line 200 can be coupled to one side of the first repair line 100 formed on the TFT substrate 11. The other side of the second repair line 200 is connected to the other side of the first repair line 100 through the signal pattern of the data TOP 60 arranged on the other end of the data PCB 20. The second repair line 200 formed on the data PCB 20 is disconnected along a laser cutting line 280 corresponding to the laser cutting line 270 of the TFT substrate 11. The third auxiliary repair line 240 connects the first auxiliary repair line 120 to the second repair line 200. Accordingly, when two first repair fines 100 are provided, four disconnected data lines DL can be repaired.

According to an exemplary embodiment, disconnected gate lines can be repaired in the substantially same manner as described above. A repair process for the disconnected gate lines can be performed by forming the first and second auxiliary repair lines with the same metal as the data line.

In an exemplary embodiment, the number of repair points can be reduced by forming the first auxiliary repair line with the same metal as the repair line and by providing the connection line connecting the second auxiliary repair line to the repair line.

Accordingly, the repair process time and the contact resistance can be reduced according to the decreased repair points, thus preventing a display defect due to RC delay of repaired signal lines.

According to exemplar embodiments of the present invention, as the number of repair points is reduced the repair success rate is increased.

Although the illustrative embodiments of the present invention have been described herein with reference to the accompanying drawings it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display substrate comprising:
   a signal line formed on a substrate;
   a connection pad receiving a driving signal from the signal line;
   at least one repair line formed along an outer periphery of the substrate;
   a first auxiliary repair line overlapping the signal line at a first position with an insulating layer disposed therebetween; a second auxiliary repair line overlapping the signal line at a second position with the insulating layer disposed therebetween; and
   a connection line connecting the second auxiliary repair line to the at least one repair line.

2. The display substrate of claim 1, wherein the first auxiliary repair line and the second auxiliary repair line are connected to the signal line during a repairing process.

3. The display substrate of claim 2, wherein the signal line comprises a gate line supplying gate-on and gate-off voltages, and a data line intersecting the gate line with the insulating layer disposed therebetween.

4. The display substrate of claim 3, wherein the display substrate further comprises a thin film transistor provided in a pixel area and connected to the gate line and the data line, and a pixel electrode connected to the thin film transistor.

5. The display substrate of claim 4, wherein the repair line is formed of the same metal as the gate line on the same plane.

6. The display substrate of claim 5, wherein the first and second auxiliary repair lines are formed of the same metal as the repair line on the same plane.

7. The display substrate of claim 6, wherein the connection line is formed of the same metal as at least one of the data line and the pixel electrode on the same plane.

8. The display substrate of claim 7, wherein the connection pad comprises a gate connection pad connected to the gate line and a data connection pad connected to the data line.

9. The display substrate of claim 8, wherein a plurality of data connection pads constitute a data connection pad block.

10. The display substrate of claim 9, wherein the first auxiliary repair line intersects the data lines connected to each of the data connection pad blocks, and one end of the first auxiliary repair line is connected to a repair connection pad included in any one of the data connection pad blocks and the other end of the first auxiliary repair fine is in a floating state.

11. The display substrate of claim 10, wherein the second auxiliary repair line intersects the data lines connected to each of the data connection pad blocks in a floating state.

12. The display substrate of claim 11, wherein the respective first and second auxiliary repair lines are provided in the same number as the repair lines.

13. The display substrate of claim 12, further comprising a dummy line extended from the first auxiliary repair line.

14. The display substrate of claim 13, wherein the dummy line intersects the repair line.

15. A liquid crystal display (LCD) device comprising:
    a liquid crystal panel;
    a panel driver connected to a connection pad of the liquid crystal panel and supplying a driving signal to a signal line of the liquid crystal panel; and
    a circuit board where a second repair line connected to a first repair line is formed,
    wherein the liquid crystal panel includes:
    a first substrate comprising:
    the signal line formed on a substrate;
    the connection pad receiving a driving signal from the signal line;
    a first repair line formed along an outer periphery of the substrate;
    a first auxiliary repair line overlapping the signal line at a first position with an insulating layer disposed therebetween;
    a second auxiliary repair line overlapping the signal line at a second position with the insulating layer disposed therebetween; and
    a connection line connecting the second auxiliary repair line to the first repair line; and
    a second substrate facing the first substrate with a liquid crystal interposed therebetween.

16. The LCD device of claim 15, wherein the first auxiliary repair line and the second auxiliary repair line are connected to the signal line during a repairing process.

17. The LCD device of claim 16, wherein the panel driver comprises:
    a gate driving circuit supplying gate-on and gate-off voltages to a gate line;
    a data driving circuit supplying a data voltage to a data line; and
    a tape carrier package mounting the data driving circuit, wherein one side of the tape carrier package is connected to the connection pad and the other side of the tape carrier package is connected to the circuit board.

18. The LCD device of claim 17, wherein the connection pad comprises:
    a gate connection pad connected to the gate line; and
    a data connection pad connected to the data line, and wherein a plurality of data connection pads constitute a data connection pad block connected to any one of the tape carrier packages.

19. The LCD device of claim 18, wherein the first and second auxiliary repair lines intersect the data lines connected to each of the data connection pad blocks.

20. The LCD device of claim 19, wherein the first auxiliary repair line is connected to a repair connection pad formed adjacent at least one of the data connection pads formed in the data connection pad block.

21. The LCD device of claim 20, wherein the circuit board includes a third auxiliary repair line connecting the second repair line and the first auxiliary repair line in a repairing process.

22. The LCD device of claim 21, wherein a number of the first repair lines is the same as a number of the second repair lines and the first to third auxiliary repair lines.

* * * * *